July 18, 1939.  L. J. WHITE  2,166,921

STORAGE AND DISPENSING SYSTEM FOR LIQUEFIED GAS

Filed April 19, 1937

Inventor
L. J. White
By A. D. Adams
Attorney

Patented July 18, 1939

2,166,921

UNITED STATES PATENT OFFICE 2,166,921

STORAGE AND DISPENSING SYSTEM FOR LIQUEFIED GAS

Loyd J. White, San Antonio, Tex., assignor to Southern Steel Company, a corporation of Texas Application April 19, 1937, Serial No. 137,827

2 Claims. (Cl. 62—1)

This invention relates to storage and dispensing systems for liquefied gas and aims to provide certain important improvements in the system shown in my Patent No. 2,042,439, dated May 26, 1936.

The main idea is to provide a system wherein the low pressure service main extends downwardly to its lowest level through an underground pressure storage tank in heat exchanging relation with the contents of the tank to revaporize any condensate that may be in the main.

A further aim is to provide a system wherein the tank does not have to be buried to a very great depth below the frost line in order to permit the service main to lead from the system and be buried in the ground below the frost line.

Figure 1:
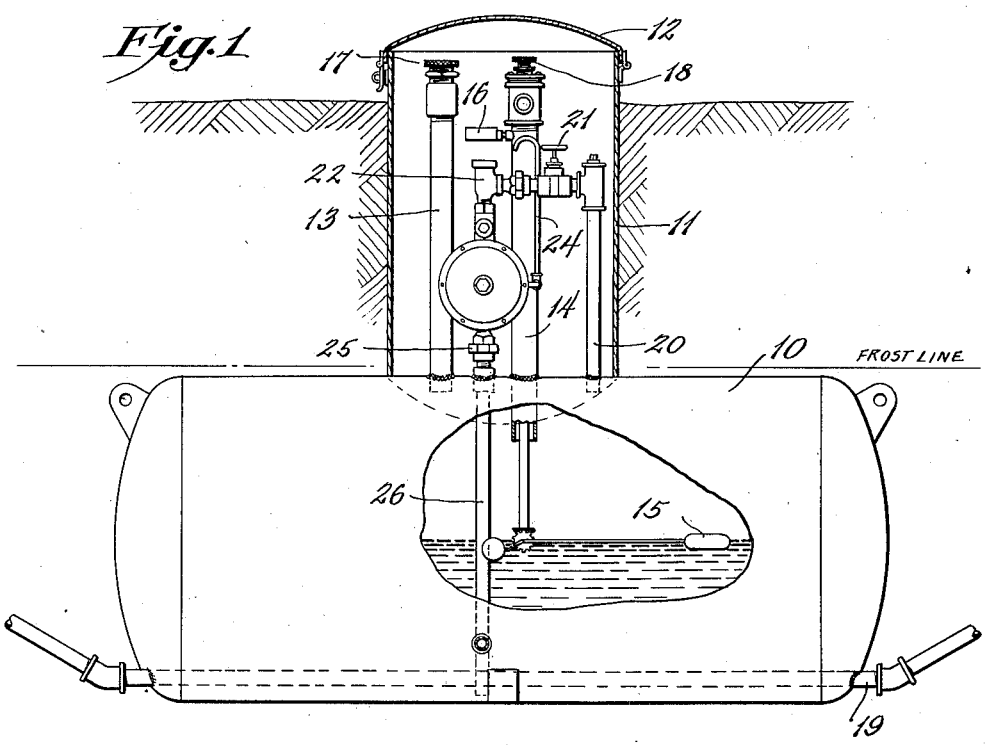
Figure 2:
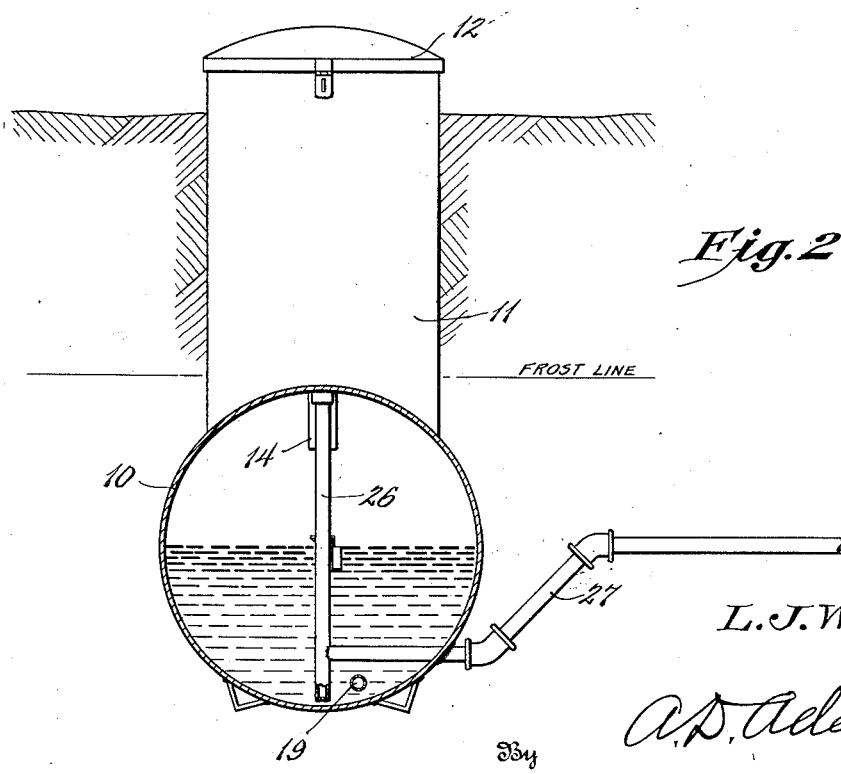

Other aims and advantages of the invention will appear in the specification, when considered in connection with the accompanying drawing, wherein:

Fig. 1 is a side elevation partly in section of a gas storage and dispensing system buried in the ground; and Fig. 2 is a vertical transverse section therethrough.

Referring particularly to the drawing, the installation there shown for illustrative purposes is designed for use in dispensing liquefied petroleum gases, such as normal butane, isobutane, propane or a mixture of butane, propane and the like. The system is adapted to be buried in the ground and, as shown in said patent, comprises generally a storage tank 10 buried entirely below the frost line and having a protecting casing 11 partially buried in and extending upwardly above the ground level with removable cover 12 on the top of the casing. The casing provides a protecting housing for the necessary appurtenances or appliances for filling the tank and controlling the flow of gas therefrom. Herein, there is shown a filling pipe 13, and a combined gauge and vent pipe 14 through which extends a liquid level gauge rod connected to a conventional float 15 for indicating the level of liquid in the tank. A pressure gauge 16 is connected to the vent pipe to indicate the pressure of the gas in the tank. Also, a pressure relief valve (not shown), is preferably connected to the gauge pipe 14 to relieve the tank of dangerous or excessive pressure.

Liquefied gas is supplied to the tank from a tank truck through the usual filling hose (not shown), which is adapted to be connected to an automatic filling check valve 17 at the top of the filling pipe 13. A second hose leading from the top of the truck tank is adapted to be connected to the vapor vent valve 18 at the top of the branch pipe connected to the combination gauge and vent pipe 14. The liquid from the truck tank flows into the tank and the vapor thus displaced passes out of the tank through the vent pipe and is added to the vapor contents of the truck tank.

As the vaporization temperature of the liquefied gas is between —47° and +33° F., depending upon its constituents, the heat of the surrounding earth is usually sufficient to keep the liquefied gas in the tank above the vaporization temperature. However, in very cold climates, it is desirable to provide additional heat which may be supplied by passing relatively warm water or other medium through a pipe 19 extending through the tank near the bottom thereof.

The vaporized gas leaves the tank through a conduit 20 having a control valve 21 and thence through an automatic excess flow check valve 22 such as is shown in my copending application, Ser. No. 106,461, filed October 19, 1936, now Patent No. 2,098,119. From the valve 22 the gas passes through the usual pressure regulator 23 having a vent 24 and to the service pipe through a coupling 25.

Heretofore, it has been the custom to extend the service pipe from the coupling 25 through the wall of the casing 11 above the tank level; thence through the ground to the house. In cold climates, this arrangement made it necessary to bury the tank too deep in the ground in order to insure that the service pipe was below the frost line. Otherwise, the gas in the main or service pipe would not remain in the vaporized state. Moreover, said arrangement necessitated an opening through the side wall of the casing so that surface water and silt would enter the casing.

To overcome these objections, the present invention provides a conduit 26 which is connected to the coupling 25 and extends downwardly to its lowest point through the top of and into the bottom of the tank. It is preferably secured to the tank wall by welding as shown. The main or service pipe 27 is adapted to be connected to the lower portion of the conduit 26 above its lower end and preferably extends upwardly a short distance and then outwardly below the frost line to the house. Thus, any gas which may be condensed in the main will flow back to the lowest point in the tank; thence into the lower end or trap in the conduit 26. Due to the relatively high pressure in the tank, the vaporization temperature of the liquefied gas therein is necessarily higher than the vaporization temperature at the low pressure existing in the conduit 26. In other words, the vaporization temperature in the conduit and service pipe 27 is always below that of the liquefied gas in the tank. Therefore, any condensate in the service pipe will always absorb sufficient heat from the contents of the tank to revaporize it. The lowest point of the pipe 26 is shown as being near the bottom of the tank for use in the coldest climates. In warmer climates, the service pipe 27 may leave the tank at a higher level.

This arrangement makes for a more rigid construction and also permits the gas main to be buried at a much lower level without requiring that the tank be buried at a great depth below the frost line.

Obviously, the present invention is not restricted to the particular embodiment thereof therein shown and described. Moreover, it is not indispensable that all the features of the invention be used conjointly, since they may be employed advantageously in various combinations and sub-combinations.

What is claimed is:

1. In a storage and dispensing system for liquefied gas, a pressure storage tank buried in the ground below the frost line; dispensing appliances, including a pressure reducing regulator connected to and located above the tank; a protecting casing for said appliances having a cover accessible from above the ground; and a service pipe connected to said pressure regulator extending downwardly through the top wall of the tank in heat exchanging relation with the contents thereof thence outwardly through the tank wall and at an upward inclination therefrom below the frost line, whereby any condensate formed in the service pipe will flow back to the lowest portion thereof within the tank and be revaporized.

2. In a storage and dispensing system for liquefied gas, a pressure storage tank buried in the ground below the frost line; dispensing appliances, including a pressure reducing regulator connected to and located above the tank; a protecting casing for said appliances having a cover accessible from above the ground; and a service pipe connected to said pressure regulator extending downwardly through the top wall of the tank in heat exchanging relation with the contents thereof thence outwardly through the tank wall and at an upward inclination therefrom below the frost line, said service pipe at its lowest portion within the tank having a depending condensate trap, whereby any condensate formed in the service pipe will drain toward or into the trap and be revaporized.

LOYD J. WHITE.